(12) United States Patent
Kragelund et al.

(10) Patent No.: US 9,496,812 B2
(45) Date of Patent: Nov. 15, 2016

(54) WIND PARK CONTROL SYSTEM

(71) Applicant: SIEMENS AKTIENGESELLSCHAFT, Munich (DE)

(72) Inventors: Martin Nygaard Kragelund, Børkop (DK); Joergen Nygaard Nielsen, Virum (DK); Tjip Pasma, Struer (DK); Jan Oestergaard Poulsen, Silkeborg (DK); Michael Stoettrup, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 372 days.

(21) Appl. No.: 13/921,547

(22) Filed: Jun. 19, 2013

(65) Prior Publication Data

US 2014/0001763 A1    Jan. 2, 2014

(30) Foreign Application Priority Data

Jun. 28, 2012   (EP) .................................... 12174100

(51) Int. Cl.
 *H02P 9/04* (2006.01)
 *F03D 7/04* (2006.01)
 *F03D 7/02* (2006.01)

(52) U.S. Cl.
 CPC ................. *H02P 9/04* (2013.01); *F03D 7/028* (2013.01); *F03D 7/047* (2013.01); *F03D 7/048* (2013.01); *Y02E 10/723* (2013.01)

(58) Field of Classification Search
 None
 See application file for complete search history.

(56) References Cited

U.S. PATENT DOCUMENTS

| | | | |
|---|---|---|---|
| 7,840,312 B2 | 11/2010 | Altemark | |
| 2010/0025994 A1 | 2/2010 | Cardinal et al. | |
| 2010/0332042 A1* | 12/2010 | Riesberg et al. | 700/287 |
| 2011/0112697 A1* | 5/2011 | Arinaga et al. | 700/287 |
| 2011/0166717 A1* | 7/2011 | Yasugi | 700/287 |
| 2012/0010756 A1 | 1/2012 | Larsen et al. | |
| 2012/0066604 A1* | 3/2012 | Vasudevarao | F03D 7/048 715/735 |
| 2012/0101643 A1* | 4/2012 | Kirchner et al. | 700/287 |

FOREIGN PATENT DOCUMENTS

| | | |
|---|---|---|
| DE | 102009030725 A1 | 12/2010 |
| EP | 1831981 B1 | 2/2012 |

* cited by examiner

*Primary Examiner* — Sean Shechtman
*Assistant Examiner* — Steven Garland

(57) ABSTRACT

A control system for controlling a set point of an individual power output of each wind turbine. The wind turbines are grouped into a plurality of groups of wind turbines and each group associated to a sub control unit. A main control unit is adapted to determine a set point for a total power output of each group based on a reference set point for an overall power output of the wind park and on data being indicative for current characteristics of the wind park and adapted to distribute the determined set points between the sub control units via main control signals being provided to the sub control units. Each main control signal is indicative for the set point. Each sub control unit is adapted to determine a set point for an individual power output.

10 Claims, 4 Drawing Sheets

WIND PARK CONTROL SYSTEM

CROSS REFERENCE TO RELATED APPLICATIONS

This application claims priority of European Patent Office application No. 12174100.3 EP filed Jun. 28, 2012. All of the applications are incorporated by reference herein in their entirety.

FIELD OF INVENTION

The present invention relates to the technical field of wind parks. In particular, the present invention relates to a control system for a wind park, in particular controlling the set point of a power output of each wind turbine in the wind park.

ART BACKGROUND

Wind parks comprise a plurality of single wind turbines. On sites with many wind turbines, the wind turbines may be divided into groups for computational and load balancing purposes. In such systems, each group of wind turbines may have a separate functionality for handling the wind turbines of this group.

However, in common systems each group handles its own control, without an overall control of the wind turbines. Thus, it may be desirable to provide an overall control system for handling and controlling multiple groups of wind turbines. In particular, it may be necessary to ensure that the wind turbines fulfill some overall requirements of the wind park.

Therefore, there may be a need for an efficient and reliable control of each wind turbine in a wind park to ensure that overall requirements are fulfilled.

SUMMARY OF THE INVENTION

This need may be met by the subject matter according to the independent claims. Advantageous embodiments of the present invention are described by the dependent claims.

According to a first aspect of the invention, there is provided a wind park control system for controlling a set point of an individual power output of each of a plurality of wind turbines of a wind park, wherein the wind turbines are grouped into at least two groups of wind turbines. The wind park control system comprises a main control unit, and at least two sub control units, wherein each sub control unit is assigned to one of the at least two groups of wind turbines. The main control unit is adapted to determine a set point for a total power output of each group of wind turbines based on a reference set point for an overall power output of the wind park and on data being indicative for current characteristics of the wind park. The main control unit is further adapted to distribute the determined set points between the sub control units via main control signals being provided to the sub control units, wherein each main control signal is indicative for the set point for the total power output of the assigned group of wind turbines. Each sub control unit is adapted to determine a set point for an individual power output of each wind turbine of the assigned group of wind turbines. Each sub control unit is further adapted to distribute the determined set points between the wind turbines of the assigned group of wind turbines via sub control signals being provided to each wind turbine of the assigned group of wind turbines, wherein each sub control signal is indicative for a set point for the individual power output of a wind turbine.

A wind park may comprise a plurality of wind turbines being grouped into multiple groups. A wind turbine may be used for generating electrical power by converting wind into electrical power. Typically, wind turbines comprise a tower, a wind turbine rotor, which is arranged at a top portion of the tower and which comprises at least one blade, and a generator being mechanically coupled with the wind turbine rotor.

Based on an input power, the wind, the generator is able to convert the input power into electrical output power. The wind park may have some requirements which should be fulfilled. These requirements may be provided to the main control unit in form of the reference set point. The reference set point may for instance be indicative for the overall power output of the wind park, i.e., the combined power output of all wind turbines.

The main control unit may decide which amount of power should be provided by which group to fulfill the overall set point. The sub control units may be divide the needed power output between the assigned wind turbines, i.e., may decide which amount of power should be provided by which wind turbine to fulfill the total set point of the corresponding group.

The set points for each group, and thus for each wind turbine, may be based on the reference set point and the wind park characteristics. The wind park characteristics may correspond for instance to a wind park topology.

As the determination of a set point for the power output for each group of wind turbines is based on a reference set point for an overall power output of the wind park and on data being indicative for current characteristics of the wind park, the set point may be adapted on current environment conditions, like available amount of wind.

The term "indicative" in this context may denote that the data comprises information about available power, available amount of wind, number of turbines, and so on.

The reference set point should be understood as reference which should be fulfilled. However, if the wind speed isn't high enough, then it won't be possible for the sub control units, wind turbines, or main control unit to get the turbines to produce that amount of power. The set points for the different groups and single wind turbines may then be adapted accordingly.

According to an embodiment of the invention, the main control signals are further indicative for a set point of the total reactive power of each group of wind turbines.

In addition to the power output, i.e., the active power of a wind turbine or group, set points for the voltage and reactive power of each group may be set and signaled to the sub control units. The reactive power and the active power may be coupled.

According to a further embodiment of the invention, the sub control signals are further indicative for a set point of the individual voltage and reactive power of each wind turbine of the assigned group.

In addition to the power output of each individual wind turbine, set points for the voltage and reactive power of each individual wind turbine may be set and signaled to the wind turbines. The reactive power and the active power may be coupled.

According to a further embodiment of the invention, the main control unit comprises a main control element being adapted to receive results of measurements of the individual power output of the wind turbines and is adapted to perform a closed loop control based on the received results and the reference set point for adjusting the set point for each group of wind turbines.

According to this embodiment, each group of turbines can be treated as an aggregate turbine capable of producing the sum of the individual turbines. Disturbances or losses between the individual groups and a common grid interface may be attenuated by the main control unit, for instance when the measurement is performed by a grid measurement unit. The main control unit may ensure that the combined output of the turbine groups match the reference set point with the desired accuracy. Further, computational and communication loads may be divided on multiple sub control units. Thus, there might be no need to handle controllers on multiple levels.

According to a further embodiment of the invention, each sub control unit comprises a sub control element being adapted to receive results of measurements of the individual power output of the wind turbines and is adapted to perform a closed loop control based on the received results and the set point being provided by the main control unit for adjusting the set point for each wind turbine.

According to this embodiment, the sub control units comprise closed loop control for providing a control for each group. The main control unit may have a control functionality for addressing communication delays and latencies in the communication to the sub control units. The group controllers, i.e., the sub control units, may be identical to controllers on common single turbine group sites.

If the two embodiments are combined, i.e., the main control unit and the sub control units comprise control elements for performing closed loop control, a two level control system may be achieved. The main control unit may ensure that the combined output of all the turbines on the site match the reference set point. The sub control units may address both the dynamics response and the accuracy requested. The control loop performed by the sub control units may attenuate disturbances occurring within that group of turbines. Computational and communication loads may be divided on multiple sub control units.

The measurements as mentioned herein may be performed by a grid measurement unit or the measurements may be calculated from measurements performed by the sub control units.

According to a further embodiment of the invention, each sub control unit has the same control functionality.

This embodiment is based on the idea, to not divide the control functionality into different kind of groups, like groups being controlled with fast power control and groups being controlled with slow power control, but to have groups being controlled by control units or controllers having the same or at least comparable control dynamics. For instance, all sub control units may be used to attenuate events and disturbances in the network, and the main control unit may provide a different kind of control used to ensure error free control.

According to a further embodiment of the invention, the wind park control system further comprises a further main control unit, wherein the further main control unit is adapted to determine a set point for a total reactive power of each group of wind turbines based on a reference set point for the overall reactive power of the wind park and on data being indicative for current characteristics of the wind park, and the further main control unit is further adapted to distribute the determined set points between the sub control units via further main control signals being provided to the sub control units, wherein each further main control signal is indicative for the set point for the total reactive power of the assigned group of wind turbines.

According to this embodiment, the functionality for setting set points for active power and/or voltage/reactive power may be divided between two main control units. In one case, the same main control unit may handle active power and voltage/reactive power or if desirable two main control units (according to this embodiment) may be configured, one for handling active power, and one for handling voltage/reactive power.

According to a further embodiment of the invention, the current characteristics of the wind park comprise at least one of current active power, current available power and number of current active wind turbines.

The current characteristics of the wind park may comprise information in view of the topology of the wind park. They may further comprise information being indicative for actual operation conditions. Based on such information, the main control unit may be able to determine in a relative exact way which group is able to provide which output power. Thus, the distribution of the set points between the groups may be improved.

According to a further embodiment of the invention, the main control unit is adapted to monitor the current characteristics of the wind park and is adapted to adapt the main control signals being provided to the sub control units in case of a change of the current characteristics of the wind park.

Based on this embodiment, the main control unit may be able to react to changes within the operating conditions or the topology of the wind park. For instance, during failure of a wind turbine, this failure may be monitored and the main control unit may adapt the distribution of the set points.

According to a further aspect of the invention, a method for controlling a set point of an individual power output of each of a plurality of wind turbines of a wind park is provided, wherein the wind turbines are grouped into at least two groups of wind turbines, the wind park control system comprising a main control unit, and at least two sub control units, wherein each sub control unit is assigned to one of the at least two groups of wind turbines. The method comprises, by the main control unit, determining a set point for a total power output of each group of wind turbines based on a reference set point for an overall power output of the wind park and on data being indicative for current characteristics of the wind park, by the main control unit, distributing the determined set points between the sub control units via main control signals being provided to the sub control units, wherein each main control signal is indicative for the set point for the total power output of the assigned group of wind turbines, by each sub control unit, determining a set point for an individual power output of each wind turbine of the assigned group of wind turbines, and, by each sub control unit, distributing the determined set points between the wind turbines of the assigned group of wind turbines via sub control signals being provided to each wind turbine of the assigned group of wind turbines, wherein each sub control signal is indicative for a set point for the individual power output of a wind turbine.

According to a further aspect of the invention, there is provided a computer program for controlling a set point of an individual power output of each of a plurality of wind turbines of a wind park, the computer program, when being executed by a data processor, is adapted for controlling the method as described above.

According to a further aspect of the invention, there is provided a computer-readable medium, in which a computer program for controlling a set point of an individual power output of each of a plurality of wind turbines of a wind park is stored, which computer program, when being executed by a processor, is adapted to carry out or control a method as described above.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiments to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with the same reference signs.

Figure 1:
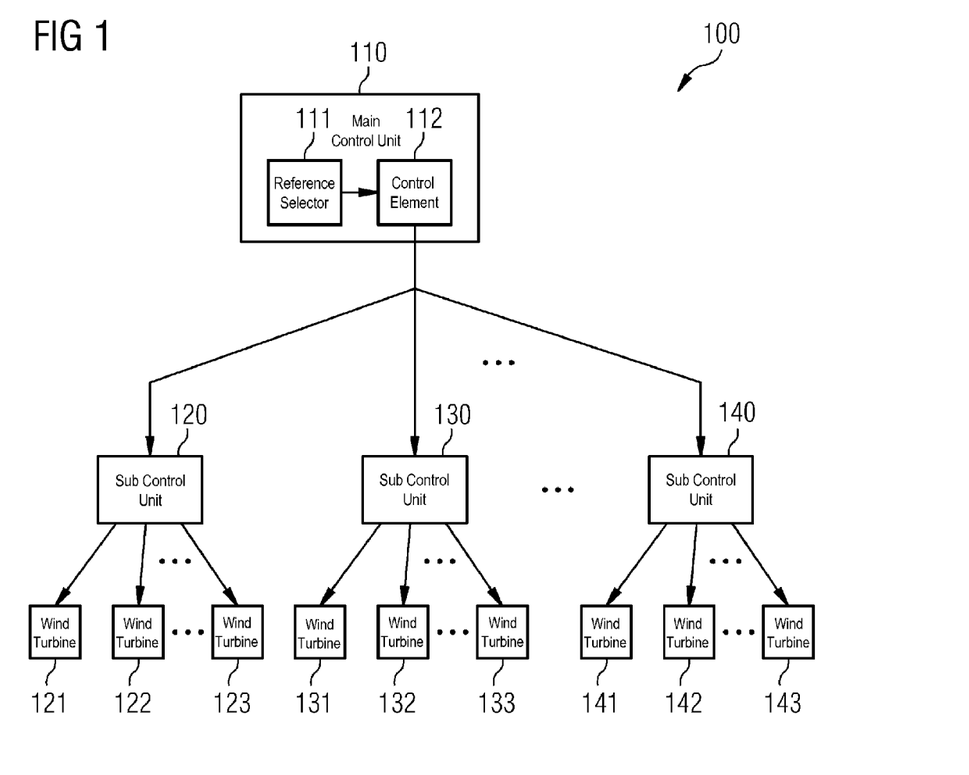
FIG. 1 shows a wind park control system according to an embodiment of the present invention.

FIG. 1 shows a wind park control system 100. The wind park control system 100 as shown comprises a main control unit 110, three sub control units 120, 130, 140 and a plurality of wind turbines 121, 122, 123, 131, 132, 133, 141, 142, 143 being assigned to the sub control units.

The wind park control system 100 may be used for controlling a set point of an individual power output of each of the plurality of wind turbines 121, 122, 123, 131, 132, 133, 141, 142, 143 of the wind park.

The main control unit 110 is adapted to determine a set point for a total power output of each group of wind turbines based on a reference set point for an overall power output of the wind park and on data being indicative for current characteristics of the wind park. The reference set point may be determined in a reference selector 111.

The reference selector 111 monitors grid conditions, and selects a reference that ensures the grid requirements are fulfilled for the entire group of turbines in the sub groups.

The main control unit 110 is further adapted to distribute the determined set points between the sub control units 120, 130, 140 via main control signals being provided to the sub control units 120, 130, 140 from a control element 112. Each main control signal is indicative for the set point for the total power output of the assigned group of wind turbines being controlled by the sub control units 120, 130, 140.

Each sub control unit 120, 130, 140 is adapted to determine a set point for an individual power output of each wind turbine 121, 122, 123, 131, 132, 133, 141, 142, 143 of the assigned group of wind turbines. Each sub control unit 120, 130, 140 is further adapted to distribute the determined set points between the wind turbines of the assigned group of wind turbines 121, 122, 123, 131, 132, 133, 141, 142, 143 via sub control signals being provided to each wind turbine of the assigned group of wind turbines. Each sub control signal is indicative for a set point for the individual power output of a wind turbine 121, 122, 123, 131, 132, 133, 141, 142, 143.

The described system may be used for controlling power or voltage/reactive power of multiple groups of wind turbines. On sites with many turbines, it can be desirable for computational and communication load balancing to divide the turbines into groups. Each group of turbines may have a functionality handling the communication to those turbines. The functionality (being provided by the sub control units, in the following also called applications) might also take over control during special network events such as frequency control. The communication to the individual turbines may take care of distributing power, voltage, and reactive power references to the turbines.

The term "voltage/reactive power control" may mean that it controls one of those quantities at a time.

The reference set point as mentioned throughout the description can be both a threshold and a value that has to be tracked. In many wind farms, the reference is set to a 'high value' that means the park will produce as much as it can. In these scenarios, the reference may typically be set to an upper limit that a transformer or a power cable is capable of handling. In other scenarios, the reference is used actively to continuously control the current output of a wind park. When that is the case, the reference is a value that the main control unit should track.

An overall control algorithm may be used for determining a total power output from the turbines. This total power output may be provided to the main control unit as reference set point. Then there are two levels of distribution. The main control unit may calculate how much power it wants from each of the participating group controllers (i.e., sub control units). Each participating group controller may distribute break down the number it receives from the main control unit to references sent to each turbine in its group.

For example, as shown in the FIGS. 1 to 4, there are three participating group controllers and the main control unit wants 175 MW totally. The main control unit will send references to each participating group controller based on the current operating conditions of the group. For the sake of the example, the power reference ends up being 50, 50, 75 MW to each of the participating group controllers. The first group controller will then distribute the 50 MW to the turbines that it controls. The distribution is based on the turbines operating condition. If they all have identical operating conditions, then the reference to each turbine will end up being 50 MW/number of turbines.

Three further embodiments for the wind park control system are described in the following with reference to FIGS. 2, 3 and 4.

Figure 2:
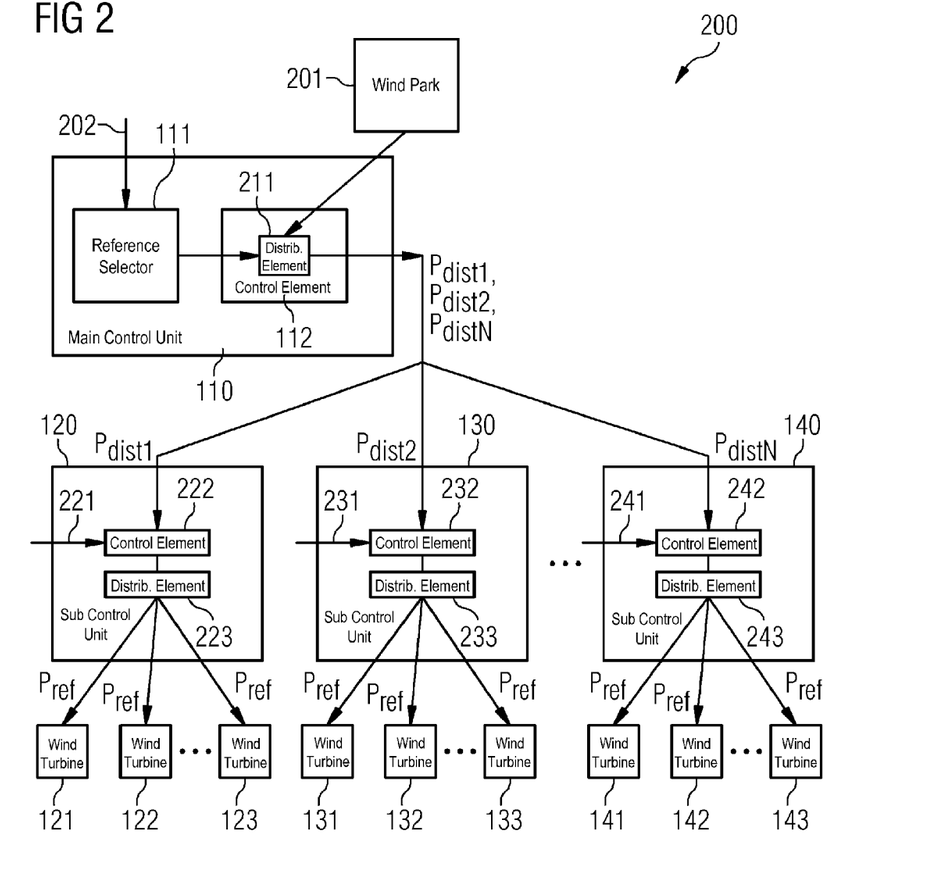
FIG. 2 shows a wind park control system according to a further embodiment of the invention.

FIG. 2 shows a distribution of set points without site level control. In the wind park control system 200, the main control unit 110 provides a site level functionality that handles distribution of the overall reference 202 (being provided to the main control unit) to each of the groups the site is divided into. In this embodiment, the main control unit does not get any measured inputs like active, reactive power, voltage or frequency and there is no site level closed loop control of power, voltage/reactive power in the main control unit.

Each of the participating groups gets their own measured input signals 221, 231, 241 and performs their local closed loop control in the control elements 222, 232, 242. The distribution function (distributing element 211) in the main control unit can handle a limitation for individual groups. An example could be that the transformer due to temperature or another operating condition can only handle 50 MW—then the power requested from that group of turbines may be limited to 50 MW.

The Pdist1, Pdist2, PdistN in FIG. 2 (being sent from the main control unit to the sub control units) can be either active power and/or voltage/reactive power. The same main control unit can handle active power and voltage/reactive power or if desirable two main control units can be configured, one for handling active power, and one for handling voltage/reactive power. The main control unit gets input information about the actual topology of the wind park or other current characteristics of the wind park 201. Each sub control unit comprises a distributing element 223, 233, 243 for distributing the individual control signals comprising the set point for the wind turbines Pref.

This embodiment is simple. Further, there are no dynamics at the main control unit level, that needs to be tuned to address the latencies in the communication and control systems in the group controllers and in the turbines. The group controllers are identical to the controllers on single turbine group sites. However, disturbances or losses between the individual groups control points and the common grid interface might not be attenuated by the group controllers. The combined control actions of the individual groups might not add up to the reference given to the main control unit, i.e., if a group of turbines cannot produce the amount of power they claim to be able to produce then that "missing" power might not be requested from the remaining groups of turbines.

Figure 3:
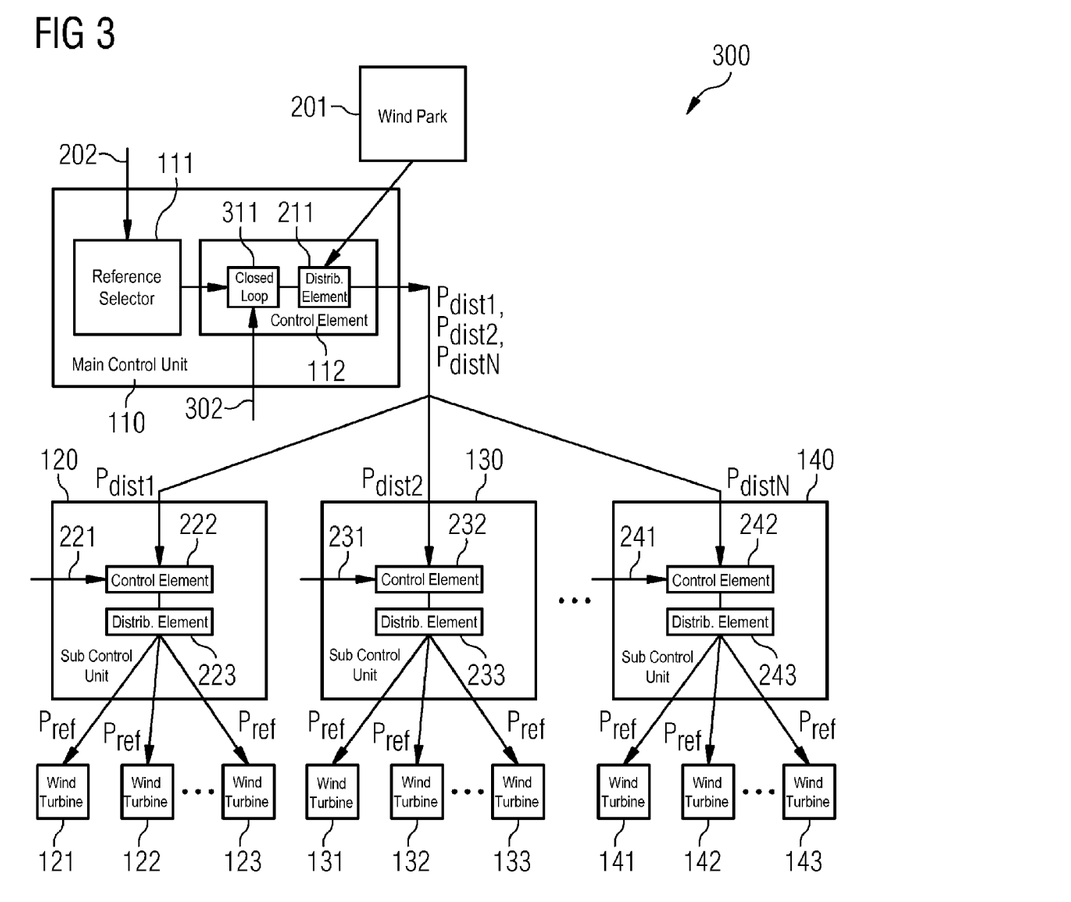
FIG. 3 shows a wind park control system according to a further embodiment of the invention.

The wind park control system 300 as shown in FIG. 3 is a two level control system. The control element 112 of the main control unit 110 comprises a closed loop control element 311 for ensuring that the combined output of all the turbines on the site matches the reference set point. The closed loop control element 311 may address both the dynamics response and the accuracy requested. The closed loop control may be performed based on received measurements 302.

The output of the control element 112 is distributed to the sub control units. The values distributed are calculated by the distribution function in the main control unit and the main control unit can handle the limitation for individual groups. An example could be that the transformer due to temperature or another operating condition can only handle 50 MW—then the power requested from that group of turbines will be limited to 50 MW. The main control unit can receive the necessary signals to perform the distribution from the individual sub control units. The signals shown in FIG. 3 are only meant as examples, so the distribution algorithm is in not limited to using those signals.

The measurement used by the control element 112 can either be performed by a grid measurement unit or the measurement can be calculated from measurements performed by the sub control units. As described in the context of FIG. 2, each sub control unit comprises a control element 222, 232, 242 for performing a closed loop control.

The Pdist1, Pdist2, PdistN in FIG. 3 can be either active power and/or voltage/reactive power. The same main control unit can handle active power and voltage/reactive power or if desirable two main control units can be configured one for handling active power, and one for handling voltage/reactive power.

In this embodiment, disturbances or losses between the individual groups control points and the common grid interface may be attenuated by the main control unit when the measurement is performed by a grid measurement unit. The main control unit ensures that the combined output of the turbine groups will match the reference set point with the desired accuracy when the measurement is performed by a grid measurement unit. The control loop performed by the sub control units can attenuate disturbances occurring within that group of turbines. Computational and communication loads are divided on multiple sub control units. However, in such a cascaded control, it might be required that the inner controller loop is much faster than the outer control loop. The dynamics of the turbines and the communication latency between the sub control units and the turbines may limit the reaction time of the inner controllers.

All groups of wind turbines may be controlled by controllers, i.e., sub control units with the same or comparable control dynamics. Thus, the control functionality should not be divided into groups with fast or slow power control. The main control unit may ensure an error free control.

Figure 4:
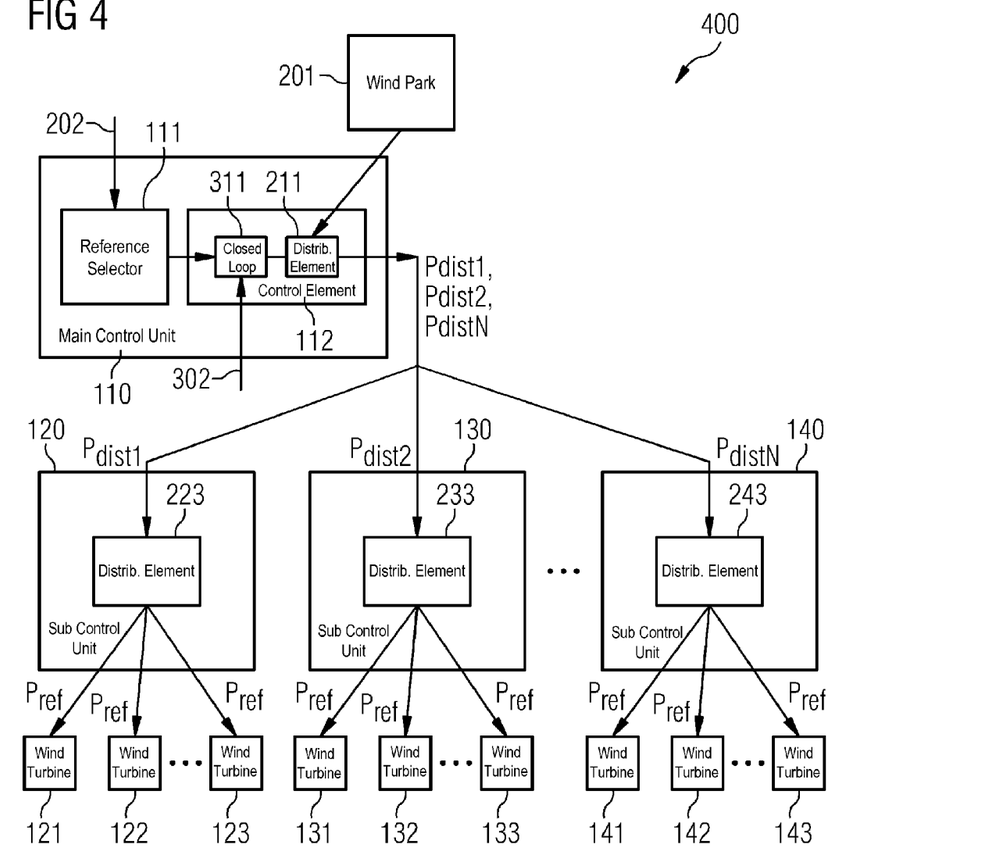
FIG. 4 shows a wind park control system according to a further embodiment of the invention.

A further embodiment of the wind park control system 400 is shown in FIG. 4. According to this embodiment, only the main control unit performs a closed loop control. The main control unit may handle the site level control and may ensure that the combined output of the groups of turbines meet the reference set point with the required response time and accuracy. The idea of this embodiment is to treat each group of turbines as an aggregate turbine capable of producing the sum of the individual turbines.

The output of the main control unit is distributed to the sub control units. The values distributed are calculated by the distribution function in the main control unit, which can handle limitation for individual groups. An example could be that the transformer due to temperature or another operating condition can only handle say 50 MW—then the power requested from that group of turbines will be limited to 50 MW.

The measurement used by the control element of the main control unit 110 can either be performed by a grid measurement unit or the measurement can be calculated from measurements performed by the sub control units. If the Governor measurement in this embodiment is based on a calculation of reported signals from the sub control units, then the sub control units 120, 130, 140 may be allowed to take over control, when they detect a frequency event (over or under frequency event). The Pdist1, Pdist2, PdistN in FIG. 4 can be either active power and/or voltage/reactive power. The same main control unit can handle active power and voltage/reactive power or if desirable two main control units can be configured, one for handling active power, and one for handling voltage/reactive power.

In this embodiment, disturbances or losses between the individual groups control points and the common grid interface may be attenuated by the main control unit when the measurement is performed by a grid measurement unit. The main control unit may ensure that the combined output of the turbine groups matches the reference set point with the desired accuracy when the measurement is performed by a grid measurement unit. Computational and communication loads are divided on multiple sub control units. There is no need to handle controllers on multiple levels. If the measurement on park level is calculated based on reported data from the sub control units, it might be necessary to freeze the output of the main control unit and let the sub control units do their own closed loop control during frequency events.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A wind park control system for controlling a set point of an individual power output of each of a plurality of wind turbines of a wind park, wherein the wind turbines are grouped into a plurality of groups of wind turbines, the wind park control system comprising:
   a main control unit, and
   a plurality of sub control units, each sub control unit is assigned to one of a plurality of groups of wind turbines,
   wherein the main control unit is adapted to determine a set point for a total power output of each group of wind turbines based on a reference set point for an overall power output of the wind park and on data being indicative for current characteristics of the wind park,
   wherein the main control unit is further adapted to distribute the determined set points between the sub control units via main control signals being provided to the sub control units,
   wherein each main control signal is indicative for the set point for the total power output of the assigned group of wind turbines,
   wherein each sub control unit is adapted to determine a set point for an individual power output of each wind turbine of the assigned group of wind turbines,
   wherein each sub control unit is further adapted to distribute the determined set points between the wind turbines of the assigned group of wind turbines via sub control signals being provided to each wind turbine of the assigned group of wind turbines, wherein each sub control signal is indicative for a set point for the individual power output of a wind turbine, and
   wherein the main control unit comprises a main control element being adapted to receive results of measurements of the individual power output of the wind turbines and is adapted to perform a closed loop control based on the received results and the reference set point for adjusting the set point for each group of wind turbines.

2. The wind park control as set forth in claim 1, wherein the main control signals are further indicative for a set point of the total reactive power of each group of wind turbines.

3. The wind park control as set forth in claim 1, wherein the sub control signals are further indicative for a set point of the individual reactive power of each wind turbine of the assigned group.

4. The wind park control as set forth in claim 1, wherein each sub control unit comprises a sub control element being adapted to receive results of measurements of the individual power output of the wind turbines and is adapted to perform a closed loop control based on the received results and the set point being provided by the main control unit for adjusting the set point for each wind turbine.

5. The wind park control as set forth in claim 1, wherein each sub control unit has the same control functionality.

6. The wind park control as set forth in claim 1, the wind park control system further comprising:
   a further main control unit, wherein the further main control unit is adapted to determine a set point for a total reactive power of each group of wind turbines based on a reference set point for the overall reactive power of the wind park and on data being indicative for current characteristics of the wind park,
   wherein the further main control unit is further adapted to distribute the determined set points between the sub control units via further main control signals being provided to the sub control units, wherein each further main control signal is indicative for the set point for the total reactive power of the assigned group of wind turbines.

7. The wind park control as set forth in claim 1, wherein the current characteristics of the wind park comprises at least one of current active power, current available power and number of current active wind turbines.

8. The wind park control as set forth in claim 1, wherein the main control unit is adapted to monitor the current characteristics of the wind park and is adapted to adapt the main control signals being provided to the sub control units in case of a change of the current characteristics of the wind park.

9. A method for controlling a set point of an individual power output of each of a plurality of wind turbines of a wind park, wherein the wind turbines are grouped into a plurality of groups of wind turbines, the wind park control system comprising a main control unit, and a plurality of sub control units, wherein each sub control unit is assigned to one of the a plurality of groups of wind turbines, wherein the main control unit comprises a main control element, the method comprising
   determining by the main control unit a set point for a total power output of each group of wind turbines based on a reference set point for an overall power output of the wind park and on data being indicative for current characteristics of the wind park,
   distributing by the main control unit the determined set points between the sub control units via main control signals being provided to the sub control units, wherein each main control signal is indicative for the set point for the total power output of the assigned group of wind turbines,
   receiving by the main control element, results of measurements of the individual power output of the wind turbines and performing a closed loop control based on the received results and the reference set point for adjusting the set point for each group of wind turbines, determining by each sub control unit a set point for an individual power output of each wind turbine of the assigned group of wind turbines, and distributing by each sub control unit the determined set points between the wind turbines of the assigned group of wind turbines via sub control signals being provided to each wind turbine of the assigned group of wind turbines, wherein each sub control signal is indicative for a set point for the individual power output of a wind turbine.

10. A non-transitory computer-readable medium, in which a computer program for controlling a set point of an individual power output of each of a plurality of wind turbines of a wind park is stored, which computer program, when being executed by a processor, is adapted to carry out or control a method as set forth in claim 9.

* * * * *